(12) United States Patent
Crisp et al.

(10) Patent No.: US 11,682,274 B2
(45) Date of Patent: Jun. 20, 2023

(54) PROGRAMMABLE DYNAMIC INFORMATION HANDLING SYSTEM RACK LIGHTING SYSTEM

(71) Applicant: Dell Products L.P., Round Rock, TX (US)

(72) Inventors: Richard A. Crisp, Austin, TX (US); Matthew B. Gilbert, Austin, TX (US); Sean P. O'Donnell, Brookline, MA (US); Robert B. Curtis, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/931,123

(22) Filed: Jul. 16, 2020

(65) Prior Publication Data
US 2022/0020248 A1     Jan. 20, 2022

(51) Int. Cl.
*G08B 5/36*     (2006.01)
*H05B 47/155*     (2020.01)

(52) U.S. Cl.
CPC .............. *G08B 5/36* (2013.01); *H05B 47/155* (2020.01)

(58) Field of Classification Search
CPC ........ G08B 5/36; H05B 47/155; H05B 41/36; H05B 41/3921; H05B 45/12; H05B 45/18; H05B 45/28; H05B 45/325; H05B 45/345; H05B 47/11; H05B 47/115; H05B 47/135; H05B 47/14; H05B 47/175; H05B 47/18; H05B 47/185; H05B 47/195; H05B 47/22; G05B 15/02; G05B 19/04; G05B 2219/163; G05B 2219/25022; G05B 2219/25257; G05B 2219/2639; G05B 2219/2642; F24F 11/30; F24F 11/62; G06F 1/3203; G06F 8/654; G06F 8/658; G08C 17/02; G08C 2201/50; G08C 2201/91; G08C 2201/92; H02J 13/0075; H02J 3/00; H02J 3/14; H02J 9/065; H02J 2310/14; H04B 10/116; H04B 10/502; H04L 12/282; H04L 12/2825; H04L 61/2038; H04L 61/6081; H04L 67/025; H04L 67/125; H04L 67/18; H04L 67/34; H04W 4/021; H04W 48/20; H04W 8/005; H04W 8/26; Y02B 20/40;

(Continued)

(56) References Cited

U.S. PATENT DOCUMENTS

2004/0090749 A1* 5/2004 McKinnon ............... H04Q 1/09
                                                                        361/724
2004/0257007 A1* 12/2004 Lys ........................ H05B 45/20
                                                                        315/312

(Continued)

*Primary Examiner* — Hai Phan
*Assistant Examiner* — Anthony D Afrifa-Kyei
(74) *Attorney, Agent, or Firm* — Jackson Walker L.L.P.

(57) ABSTRACT

A programmable dynamic information handling system rack lighting system may include an array of a plurality of visual indicators configured to be programmed such that each information handling system of a chassis is associated with a set of one or more of the plurality of visual indicators and a lighting control subsystem configured to control illumination of the plurality of visual indicators based on statuses of information handling systems of the chassis, such that the lighting control subsystem causes each set of the visual indicators to illuminate based on a status of the respective information handling system associated with such set.

18 Claims, 7 Drawing Sheets

(58) Field of Classification Search
CPC ..... Y02B 70/3225; Y02B 90/20; Y02P 80/10;
Y04S 20/12; Y04S 20/222; Y04S 40/126
See application file for complete search history.

(56) References Cited

U.S. PATENT DOCUMENTS

| | | | |
|---|---|---|---|
| 2013/0141243 A1* | 6/2013 | Watts | H05K 7/20727 |
| | | | 361/679.48 |
| 2015/0243140 A1* | 8/2015 | Barrett | G06F 1/182 |
| | | | 340/815.4 |
| 2019/0042349 A1* | 2/2019 | Sawal | G06F 11/0781 |

\* cited by examiner

PROGRAMMABLE DYNAMIC INFORMATION HANDLING SYSTEM RACK LIGHTING SYSTEM

TECHNICAL FIELD

The present disclosure relates in general to information handling systems, and more particularly to methods and systems for management and administration of multiple information handling systems in a datacenter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system datacenters often include tens to hundreds of rack enclosures—each containing multiple servers, storage devices, and network switches. Each server may include one or more visual indicators (e.g., light emitting diodes) that present information to users (e.g., administrators/information technology technicians, etc.). In some instances, this information presentation from numerous sources may create cognitive overload for a user which may lead to the user requiring significant time to diagnose any problems due to all of the visual noise. In particular, it may be challenging for a user to identify an individual faulted information handling server within a datacenter.

SUMMARY

In accordance with the teachings of the present disclosure, the disadvantages and problems associated with existing approaches to management and administration of multiple information handling systems in a datacenter may be reduced or eliminated.

In accordance with embodiments of the present disclosure, a programmable dynamic information handling system rack lighting system may include an array of a plurality of visual indicators configured to be programmed such that each information handling system of a chassis is associated with a set of one or more of the plurality of visual indicators and a lighting control subsystem configured to control illumination of the plurality of visual indicators based on statuses of information handling systems of the chassis, such that the lighting control subsystem causes each set of the visual indicators to illuminate based on a status of the respective information handling system associated with such set.

In accordance with these and other embodiments of the present disclosure, a method may include programming an array of a plurality of visual indicators such that each information handling system of a chassis is associated with a set of one or more of the plurality of visual indicators and controlling illumination of the plurality of visual indicators based on statuses of information handling systems of the chassis, such that a lighting control subsystem causes each set of the visual indicators to illuminate based on a status of the respective information handling system associated with such set.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to program an array of a plurality of visual indicators such that each information handling system of a chassis is associated with a set of one or more of the plurality of visual indicators and control illumination of the plurality of visual indicators based on statuses of information handling systems of the chassis, such that a lighting control subsystem causes each set of the visual indicators to illuminate based on a status of the respective information handling system associated with such set.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
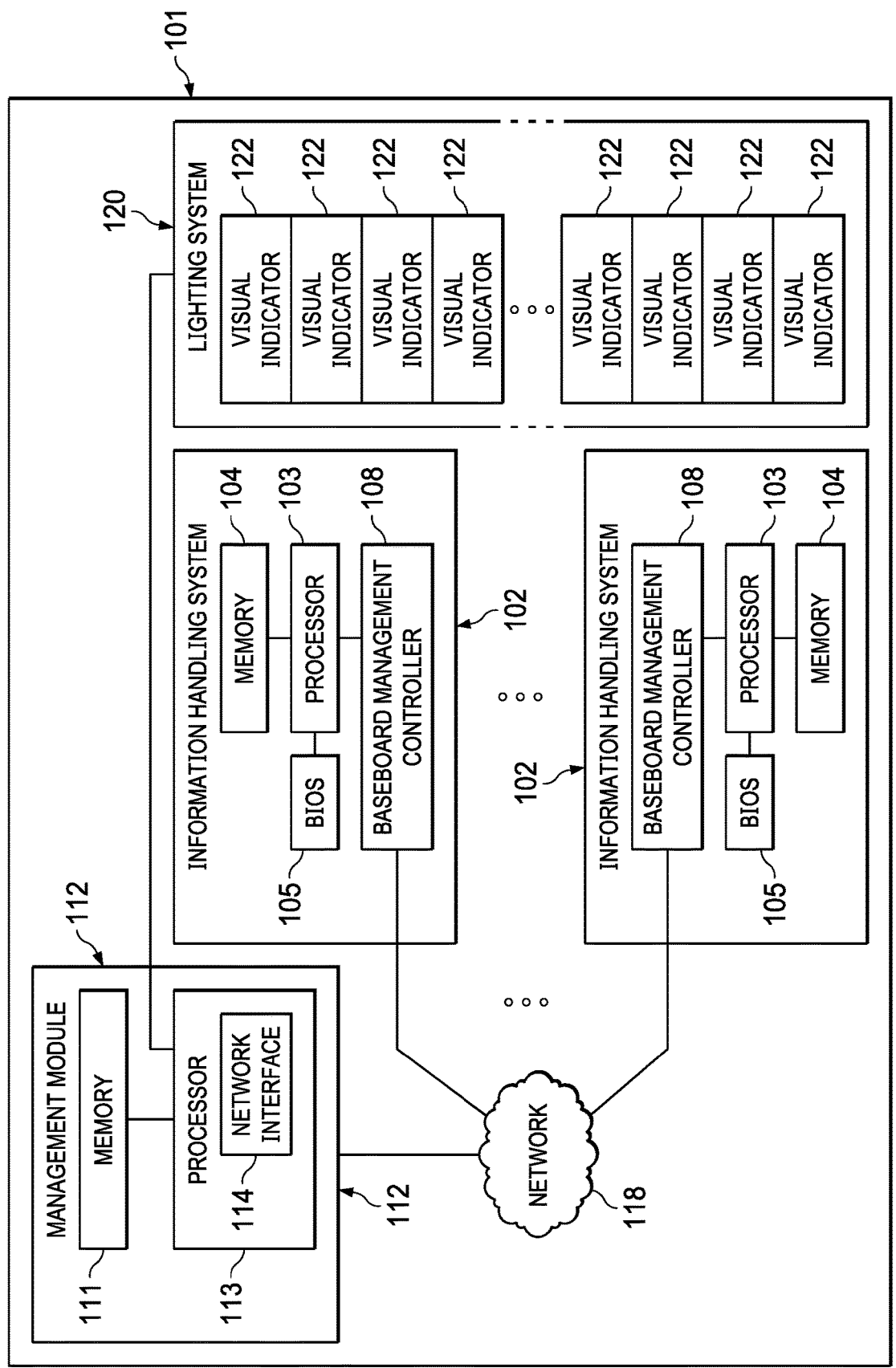
FIG. 1 illustrates a block diagram of an example chassis comprising a plurality of information handling systems, in accordance with embodiments of the present disclosure.

FIG. 1 illustrates a block diagram of an example chassis 101 comprising a plurality of information handling systems 102, in accordance with embodiments of the present disclosure. Chassis 101 may be configured to enclose, house, or support a plurality of information handling resources, including a plurality of modular information handling systems 102 (e.g., sleds), a management module 112, an internal network 118, and a programmable dynamic lighting system 120 communicatively coupled to management module 112 via any suitable communication interface.

Chassis 101 may include any suitable enclosure for housing various components, and may also be referred to as a rack, tower, enclosure, and/or housing.

As shown in FIG. 1, an information handling system 102 may include a processor 103, a memory 104 communicatively coupled to processor 103, a basic input/output system (BIOS) 105 communicatively coupled to processor 103, and a baseboard management controller 108 communicatively coupled to processor 103.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in an associated memory 104 and/or another component of its associated information handling system 102.

A memory 104 may be communicatively coupled to an associated processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

A BIOS 105 may be communicatively coupled to an associated processor 103 and may include any system, device, or apparatus configured to identify, test, and/or initialize information handling resources of an associated information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, a BIOS 105 may comprise boot firmware configured to be the first code executed by processor 103 when information handling system 102 is booted and/or powered on. As part of its initialization functionality, BIOS 105 code may be configured to set components of information handling system 102 into a known state, so that one or more applications (e.g., an operating system or other application programs) stored on compatible media (e.g., memory 104) may be executed by processor 103 and given control of information handling system 102.

A baseboard management controller 108 may be configured to provide out-of-band management facilities for management of information handling system 102. Such management may be made by baseboard management controller 108 even if information handling system 102 is powered off or powered to a standby state. In certain embodiments, baseboard management controller 108 may include or may be an integral part of a remote access controller (e.g., a Dell Remote Access Controller or Integrated Dell Remote Access Controller).

Although, for the purposes of clarity and exposition, FIG. 1 depicts only two information handling systems 102 within chassis 101, it is understood that chassis 101 may be configured to house any suitable number of information handling systems 102.

In addition to a processor 103, a memory 104, BIOS 105, and a baseboard management controller 108, an information handling system 102 may include one or more other information handling resources. For example, in some embodiments, an information handling system 102 may include more than one memory 104. As another example, in some embodiments, an information handling system 102 may include a programmable logic device (e.g., integral to or separate from baseboard management controller 108).

Management module 112 may be configured to provide out-of-band management facilities for management of shared chassis infrastructure of chassis 101, such as air movers, power supply units, and/or other components shared by a plurality of information handling systems 102. Management module 112 may also be configured to perform management of individual information handling systems 102 of chassis 101. Such management may be made by management module 112 even if chassis 101 is powered off or powered to a standby state. Management module 112 may include a processor 113 and one or more memories 111. In certain embodiments, management module 112 may include or may be an integral part of an enclosure controller (EC). In other embodiments, management module 112 may include or may be an integral part of a chassis management controller (CMC). In some embodiments, management module 112 may also be referred to as a "chassis manager." In yet other embodiments, management module 112 may include or may be an integral part of a group manager configured to manage multiple information handling systems 102 spread across multiple chassis 101.

In some embodiments, management module 112 may execute a system management console that provides a graphical user interface or another interface allowing an administrator (e.g., either locally to chassis 101 or via another network interface of management module 112 not explicitly depicted in FIG. 1) to manage chassis 101 and information handling systems 102, including issuing management commands for chassis 101 and information handling systems 102.

Although, for the purposes of clarity and exposition, FIG. 1 depicts only one management module 112, it is understood that chassis 101 may comprise any suitable number of management modules 112. For example, in some embodiments, two management modules 112 may be arranged in a redundant configuration, in which, at a given moment, one management module 112 may be "active" in that it is actively functional and performing its functionality, while another management module 112 is in a "standby" mode and may become active in the event that the active management module 112 experiences a fault or failure that causes it to failover to the standby management module 112.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions (e.g., firmware) and/or process data stored in memory 111 and/or another component of chassis 101 or management module 112. In some embodiments, processor 113 may comprise an enclosure controller configured to execute firmware relating to functionality as an enclosure controller. As shown in FIG. 1, processor 113 may include a network interface 114 for communicating with an internal network 118 of chassis 101.

Memory 111 may be communicatively coupled to processor 113 and may include any system, device, or apparatus configured to retain program instructions and/or data for a period of time (e.g., computer-readable media). Memory 111 may include RAM, EEPROM, a PCMCIA card, flash memory, magnetic storage, opto-magnetic storage, or any suitable selection and/or array of volatile or non-volatile memory that retains data after power to management module 112 is turned off.

Internal network 118 may comprise any suitable system, apparatus, or device operable to serve as communication infrastructure for network interface 114 to communicate to one or more other components, such as baseboard management controllers 108 of information handling systems 102. In some embodiments, internal network 118 may implement an Internet Protocol Management Bus (IPMB).

Lighting system 120 may include an array of addressable visual indicators 122, arranged in a row, bank, or other suitable manner. Each visual indicator 122 may include one or more light-emitting diodes, or one or more other sources of light.

In addition to information handling systems 102, management module 112, internal network 118, and lighting system 120, chassis 101 may include one or more other information handling resources. As an example, in some embodiments, an information handling system 102 may include a programmable logic device (e.g., integral to or separate from management module 112).

In operation, as described in greater detail below, visual indicators 122 may each be separately addressable and controlled to visually indicate status information associated with an information handling system of interest. For example, in a chassis 101 in which information handling systems 102 are arranged vertically, lighting system 120 may include a vertical array of visual indicators 122, and lighting system 120 may be programmed such that each information handling system 102 has one or more visual indicators 122 physically proximate to information handling system 102 to indicate a status of such information handling system 102. Such status may be based on status information or telemetry information communicated from baseboard management controllers 108 to management module 112. In some embodiments, the number of visual indicators 122 programmed to be associated with an information handling system 102 may depend on a size of information handling system 102 within chassis 101. For example, one visual indicator 122 may be associated with a 1U-height information handling system 102, two visual indicators 122 may be associated with a 2U-height information handling system 102, and so on.

In some embodiments, lighting system 120 and visual indicators 122 may have multiple functions including, without limitation, an ability to:
  illuminate all visual indicators 122 in a chassis 101 to provide light to aid a user in servicing chassis 101;
  provide an error indicator reporting when an information handling system 102 has faulted;
  provide a thermal overlay to aid a user in diagnosing "hot spots" within a chassis 101; and
  provide a visual pathway to guide a user to a faulted information handling system 102.

In some embodiments, chassis 101 may include lighting system 120 as an integral component thereof. In other embodiments, lighting system 120 may be retrofitted to an existing chassis 101 by way of a suitable add-on or upgrade kit.

Figure 2:
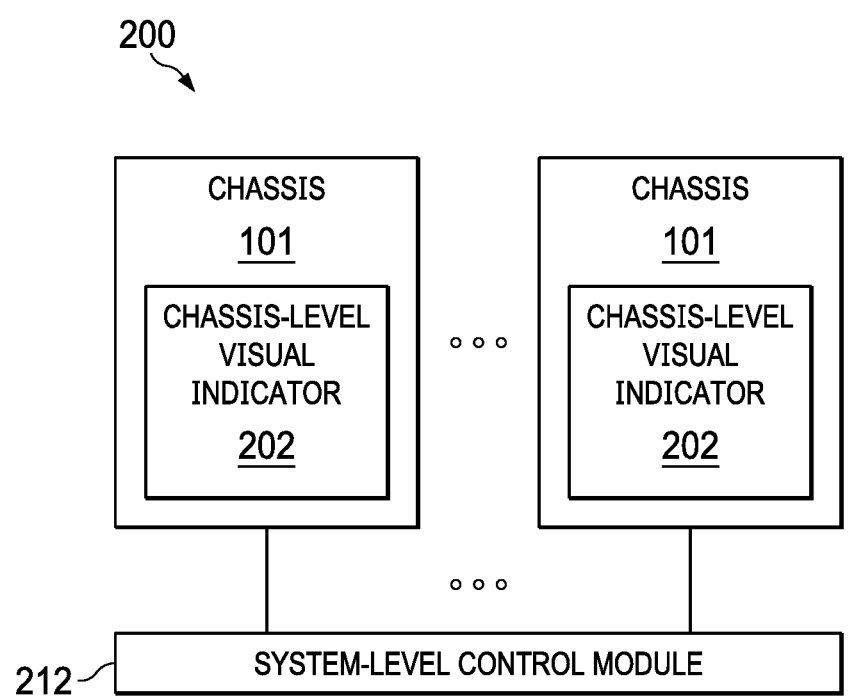
FIG. 2 illustrates a block diagram of an example system comprising a plurality of chassis, in accordance with embodiments of the present disclosure.

Although the foregoing contemplates the use of a lighting system 120 as an information handling system-level status indicator, in some embodiments a system of multiple chassis 101 (e.g., in a datacenter) may each be equipped with a lighting system 120 forming an aggregate lighting system to allow a user to identify faults at the chassis level. For example, FIG. 2 illustrates a block diagram of an example system 200 comprising a plurality of chassis 101, in accordance with embodiments of the present disclosure. As shown in FIG. 2, in addition to an array of visual indicators 122 within each chassis to identify statuses of individual information handling systems 102, each chassis 101 may include a visual indicator 202 programmed to identify status within such chassis 101. In such example, visual indicators 122 may be arranged vertically in chassis 101 and chassis-level visual indicators 202 may be arranged horizontally (e.g., along the floor at the respective bases of the plurality of chassis 101, on a door handle for each chassis 101, etc.). Also as shown in FIG. 2, system 200 may include a system-level control module 212 to control visual indicators 122 and chassis-level visual indicators 202. System-level control module 212 may comprise an information handling system 102, a group manager management module 112 within an information handling system 102, or a special purpose controller configured to communicate with management modules 112 of chassis 101 and/or baseboard management controllers 108 to obtain status information and/or telemetry information associated with chassis 101 and information handling systems 102 and control visual indicators 122 and chassis-level visual indicators 202 based on such information.

Figure 3:
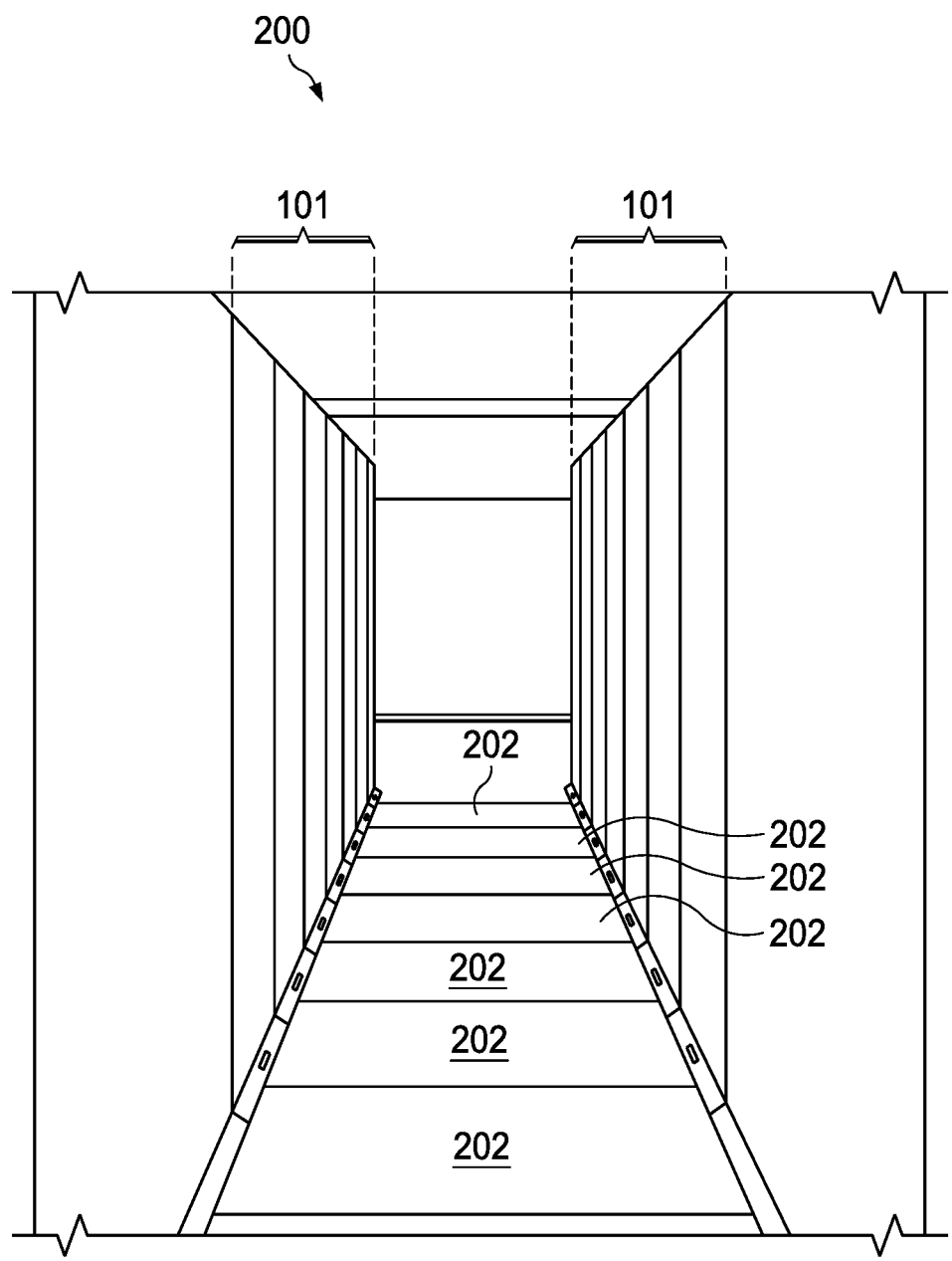
FIG. 3 illustrates a system comprising a row of chassis with a chassis-level visual indicator associated with a particular chassis indicating a status associated with an information handling system located in such chassis, in accordance with embodiments of the present disclosure.
Figure 4:
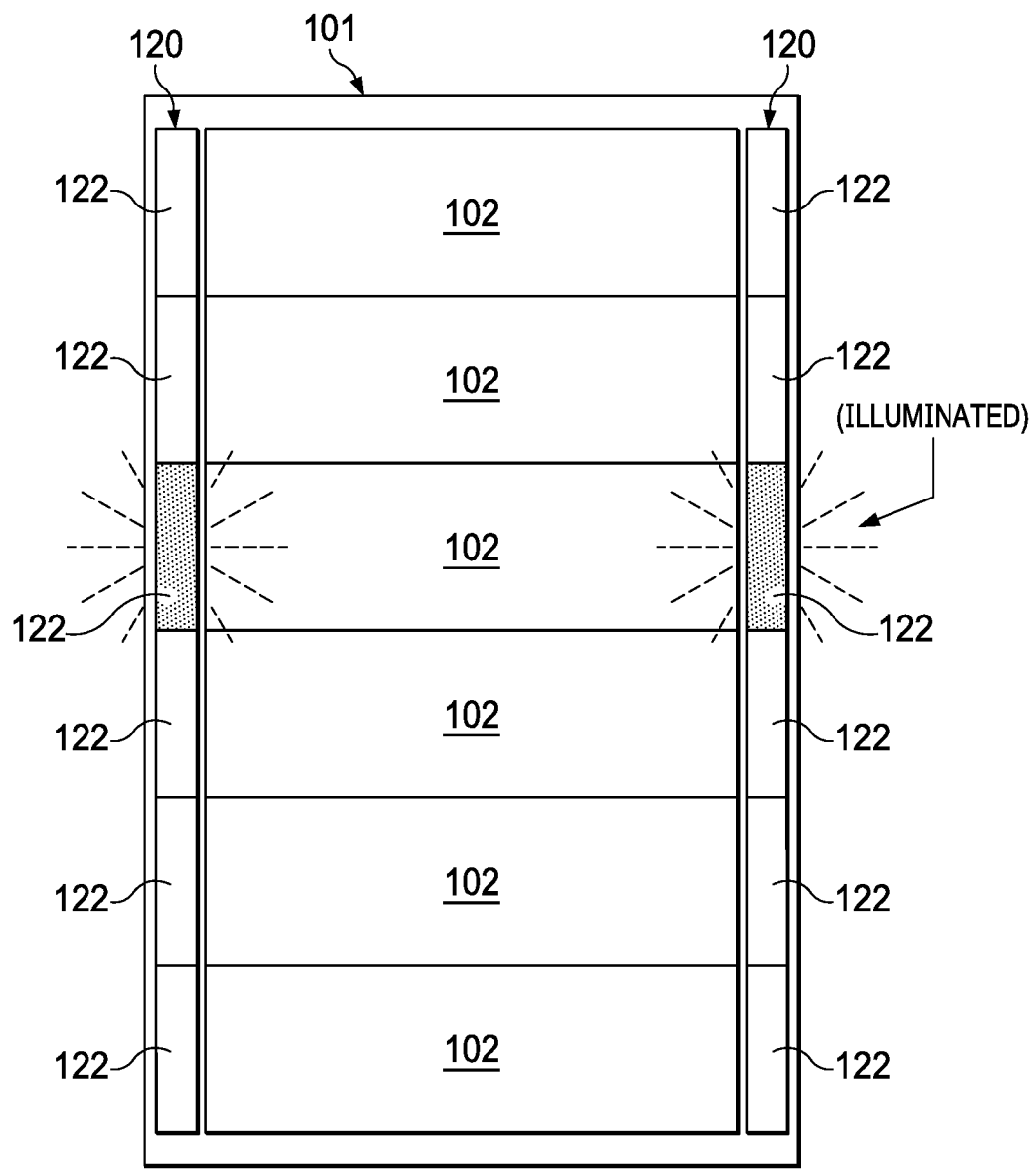
FIG. 4 illustrates a chassis with a visual indicator associated with a particular information handling system indicating a status associated with an information handling system located in such chassis, in accordance with embodiments of the present disclosure.
Figure 5:
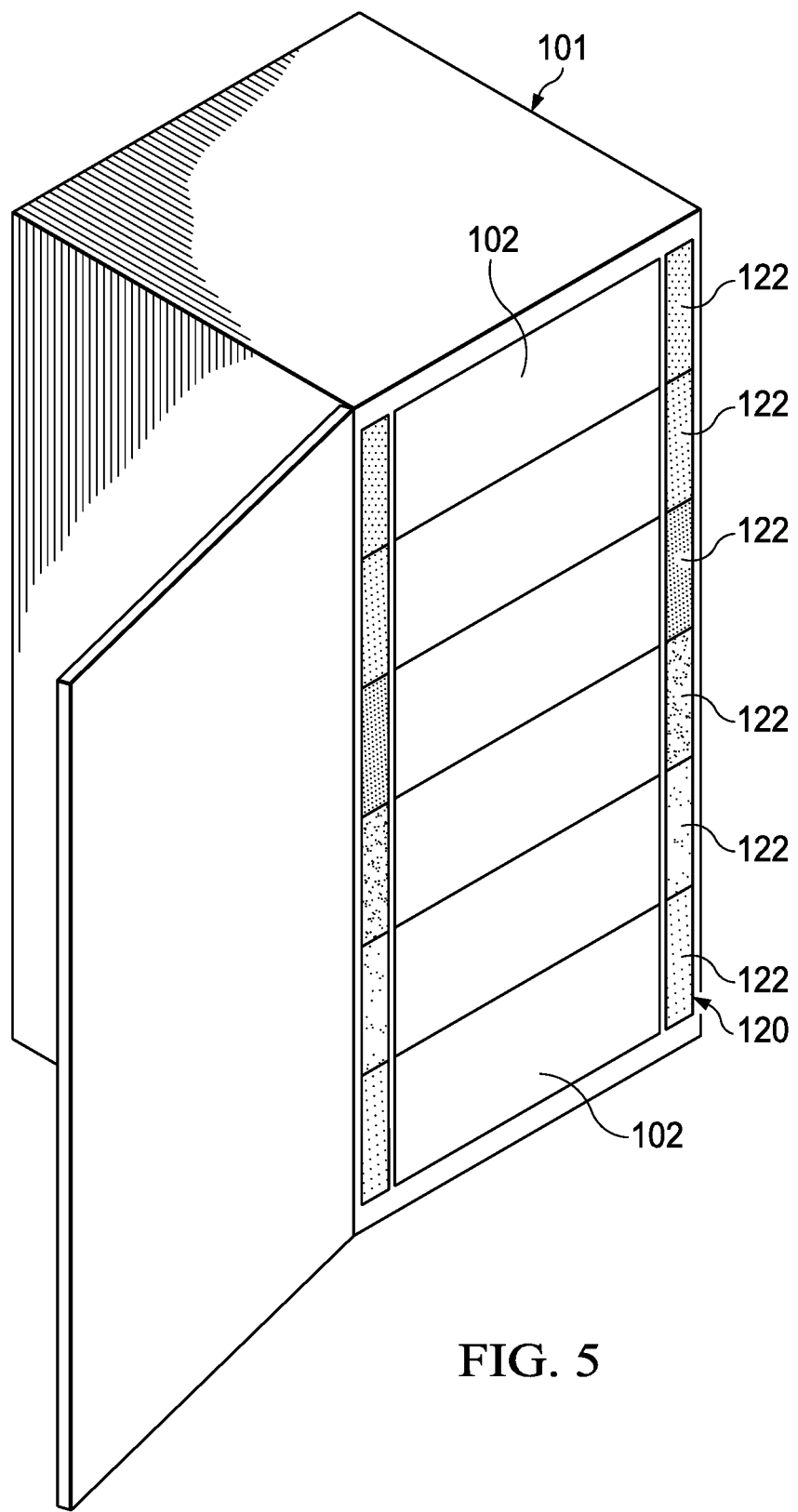
FIG. 5 illustrates a chassis with visual indicators indicating temperature information for such chassis, in accordance with embodiments of the present disclosure.

Examples of such above-described functionality is illustrated in FIGS. 3-5, below. FIG. 3 illustrates a system 200 comprising a row of chassis 101 with a chassis-level visual indicator 202 associated with a particular chassis 101 indicating a status associated with an information handling system 102 located in such chassis 101, in accordance with embodiments of the present disclosure. Thus, when an event (e.g., a fault or failure) occurs in an information handling system 102 of a chassis 101 (as may be reported by baseboard management controller 108 of such information handling system 102), system-level control module 212 may cause chassis-level visual indicator 202 associated with the particular chassis 101 housing the information handling system 102 experiencing the event to indicate the event has occurred. In some embodiments, system-level control module 212 may cause the chassis-level visual indicator 202 associated with the particular chassis 101 to illuminate while leaving chassis-level visual indicators 202 associated with other chassis 101 non-illuminated. In other embodiments, system-level control module 212 may cause the chassis-level visual indicator 202 associated with the particular chassis 101 to illuminate a particular color (e.g., amber) while leaving chassis-level visual indicators 202 associated with other chassis 101 another color (e.g., white).

FIG. 4 illustrates a chassis 101 with a visual indicator 122 associated with a particular information handling system 102 indicating a status associated with the particular information handling system 102, in accordance with embodiments of the present disclosure. Thus, when an event (e.g., a fault or failure) occurs in an information handling system 102 of a chassis 101 (as may be reported by baseboard management controller 108 of such information handling system 102), management module 112 and/or system-level control module 212 may cause visual indicator 122 associated with the particular information handling system 102 experiencing the event to indicate the event has occurred. In some embodiments, management module 112 and/or system-level control module 212 may cause the visual indicator 122 associated with the particular information handling system 102 to illuminate while leaving visual indicators 122 associated with other information handling systems 102 in chassis 101 non-illuminated. In other embodiments, management module 112 and/or system-level control module 212 may cause the visual indicator 122 associated with the particular information handling system 102 to illuminate a particular color (e.g., amber) while leaving visual indicators 122 associated with other information handling systems of the chassis 101 another color (e.g., white).

Thus, when entering a datacenter, a user may quickly be lead to an information handling system 102 experiencing an event by seeing chassis-level visual indicator 202 indicating an affected chassis 101, and once the user is at the affected chassis 101, by seeing visual indicator 122 indicating the affected information handling system 102.

In addition, in some embodiments, management module 112 may cause illumination of visual indicators 122 at selected times to provide light to aid a user in servicing a chassis 101. For example, in response to an event indicating a user presence at a chassis 101 (e.g., opening a door to the chassis 101, removing an information handling system 102 from the chassis, etc.), management module 112 may cause illumination of all or most of visual indicators 122, thus providing light which may aid the user in servicing chassis 101.

FIG. 5 illustrates a chassis 101 with visual indicators 122 indicating temperature information for such chassis 101, in accordance with embodiments of the present disclosure. Although not explicitly shown in the figures, chassis 101 may include one or more temperature sensors communicatively coupled to management module 112 and/or information handling systems 102 that report temperature readings to baseboard management controllers 108 which may in turn communicate such temperature information to management module 112. By knowing a physical location of such temperature sensors, management module 112 may use such temperature information to, in effect, create a "temperature map" of the chassis 101 using visual indicators 122, with each of the various visual indicators 112 programmed to display a color associated with a temperature proximate to such visual indicator 122. For example, a continuum of red, orange, yellow, green, blue, and purple may each represent a range of temperatures.

Figure 6:
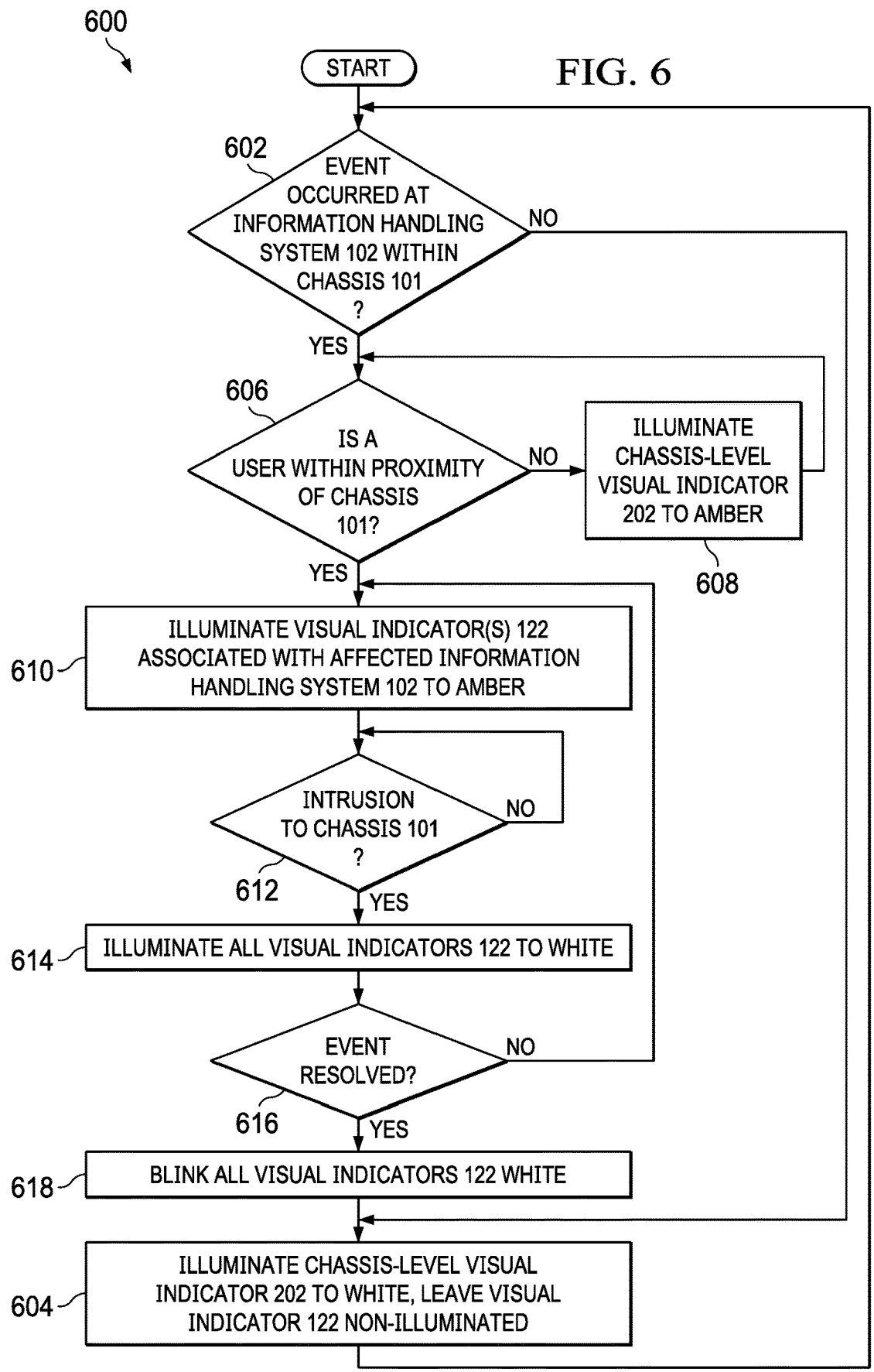
FIG. 6 illustrates a flow chart of an example method for event indication using programmable dynamic lighting control, in accordance with embodiments of the present disclosure.

FIG. 6 illustrates a flow chart of an example method 600 for event indication using programmable dynamic lighting control, in accordance with embodiments of the present disclosure. According to some embodiments, method 600 may begin at step 602. As noted above, teachings of the present disclosure may be implemented in a variety of configurations of chassis 101 and information handling systems 102. As such, the preferred initialization point for method 600 and the order of the steps comprising method 600 may depend on the implementation chosen.

At step 602, a lighting control subsystem, which may be implemented by one or both of a management module 112 and system-level control module 212, may determine if an event (e.g., fault, failure, or error) occurred at an information handling system 102 within a chassis 101. Such event may be detected by the lighting control subsystem based on information communicated from baseboard management controller 108 of such affected information handling system 102. If an event has occurred at an information handling system 102 within a chassis 101, method 600 may proceed to step 606. Otherwise, method 600 may proceed to step 604.

At step 604, responsive to no event occurring within an information handling system 102 of the chassis 101, the lighting control subsystem may illuminate the chassis-level visual indicator 202 associated with the chassis 101, and leave visual indicators 122 of the chassis non-illuminated. After completion of step 604, method 600 may proceed again to step 602.

At step 606, responsive to an event occurring at an information handling system 102 within a chassis 101, the lighting control subsystem may determine if a user is within a proximity of the chassis 101. Such proximity may be detected in any suitable manner, including a motion detector or a user's interaction with the chassis 101 (e.g., opening a door to the chassis 101). If a user is not within proximity of the chassis 101, method 600 may proceed to step 608. Otherwise, method 600 may proceed to step 610.

At step 608, responsive to a user not being within proximity of the chassis 101, the lighting control subsystem may cause chassis-level visual indicator 202 associated with the chassis 101 to illuminate to amber. After completion of step 608, method 600 may proceed again to step 606.

At step 610, responsive to a user being within proximity of the chassis 101, the lighting control subsystem may cause the visual indicator(s) 202 associated with the affected information handling system 102 to illuminate to amber.

At step 612, the lighting control subsystem may determine if a chassis intrusion has occurred. Such chassis intrusion may be an indication that a user has attempted to service the affected information handling system 102, such as removing the affected information handling system 102 from chassis 101. If a chassis intrusion occurs, method 600 may proceed to step 614. Otherwise, method 600 may remain at step 612 until a chassis intrusion occurs.

At step 614, in response to the chassis intrusion, the lighting control subsystem may cause all visual indicators 122 of the chassis 101 to illuminate to white, thus providing illumination to assist the user in servicing the affected information handling system 102. In some embodiments, the lighting control subsystem may cause visual indicators 122 to illuminate to their maximum brightness or a brightness level set by the user.

At step 616, after the user has attempted to resolve the event, the lighting control subsystem may determine if the event has been resolved. If the event has been resolved, method 600 may proceed to step 618. Otherwise, method 600 may proceed again to step 610.

At step 618, in response to the event of the affected information handling system 102 begin resolved, the lighting control subsystem may cause all visual indicators 122 of the chassis 101 to blink a defined number of times or perform some other action to indicate that the event has been resolved. After completion of step 618, method 600 may proceed again to step 602.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using a management module 112, system-level control module 212, and/or any other system operable to implement method 600. In certain embodiments, method 600 may be implemented partially or fully in software and/or firmware embodied in computer-readable media.

Figure 7:
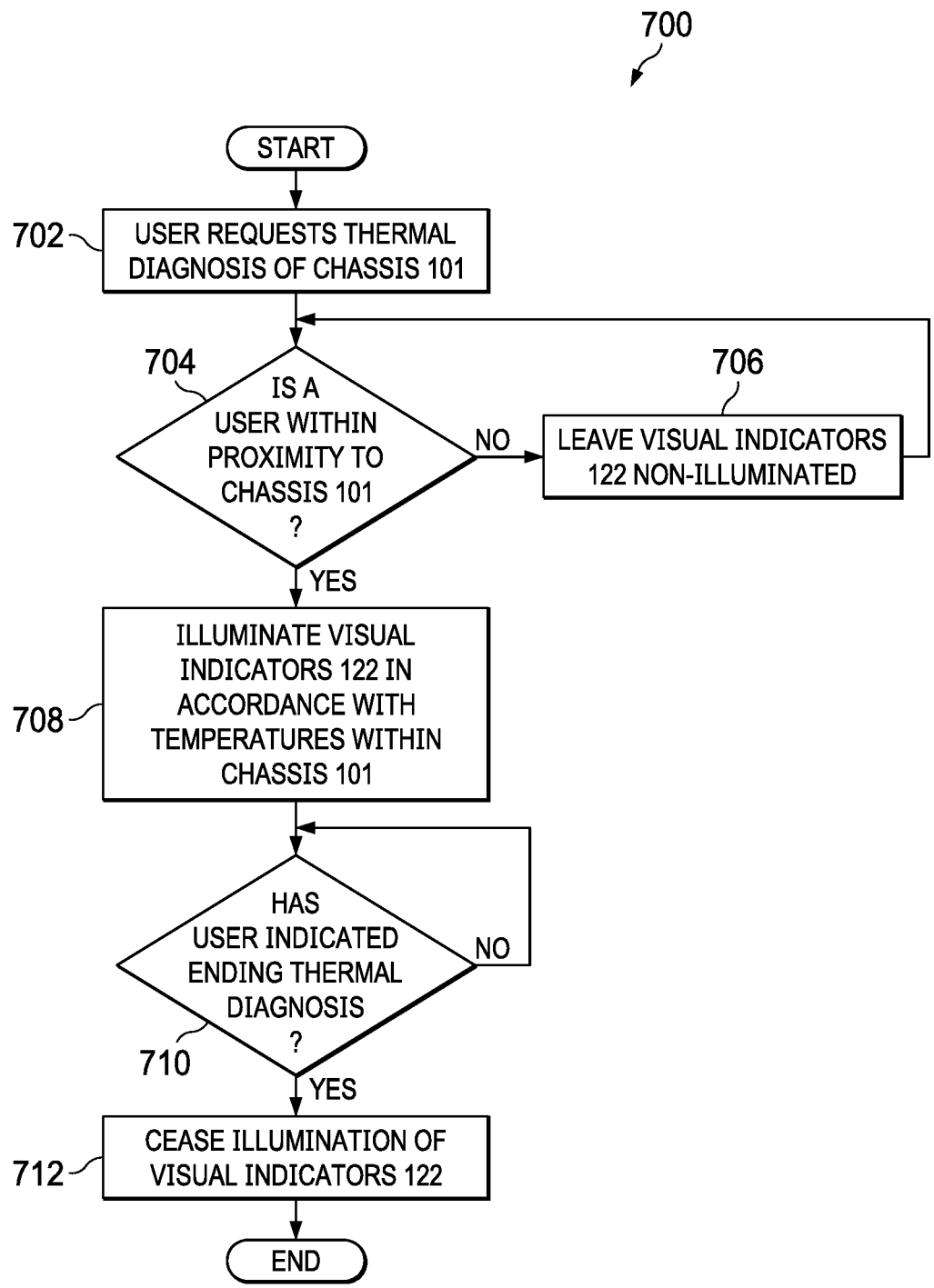
FIG. 7 illustrates a flow chart of an example method for thermal mapping of a chassis using programmable dynamic lighting control, in accordance with embodiments of the present disclosure.

FIG. 7 illustrates a flow chart of an example method 700 for thermal mapping of a chassis 101 using programmable dynamic lighting control, in accordance with embodiments of the present disclosure. According to some embodiments, method 700 may begin at step 702. As noted above, teachings of the present disclosure may be implemented in a variety of configurations of chassis 101 and information handling systems 102. As such, the preferred initialization point for method 700 and the order of the steps comprising method 700 may depend on the implementation chosen.

At step 702, a lighting control subsystem, which may be implemented by one or both of a management module 112 and system-level control module 212, may receive a user request for thermal diagnosis of chassis 101. Examples of such user request are a user interaction (e.g., button press) indicating such request and a user's interaction with a management console interfacing with management module 112.

At step 704, responsive to the user request for thermal diagnosis of chassis 101, the lighting control subsystem may determine if a user is within a proximity of the chassis 101. Such proximity may be detected in any suitable manner, including a motion detector or a user's interaction with the chassis 101 (e.g., opening a door to the chassis 101). If a user is not within proximity of the chassis 101, method 600 may proceed to step 706. Otherwise, method 600 may proceed to step 708.

At step 706, responsive to no user being proximate to chassis 101, the lighting control subsystem may leave visual indicators 122 of the chassis non-illuminated. After completion of step 706, method 700 may proceed again to step 704.

At step 708, responsive to a user being proximate to chassis 101, the lighting control subsystem may illuminate visual indicators 122 in accordance with temperatures present in chassis 101. As described above, chassis 101 may include one or more temperature sensors communicatively coupled to management module 112 and/or information handling systems 102 may include temperature sensors that report temperature readings to baseboard management controllers 108 which may in turn communicate such temperature information to management module 112. By knowing a physical location of such temperature sensors, the lighting control subsystem may use such temperature information to, in effect, create a "temperature map" of the chassis 101 using visual indicators 122, with each of the various visual indicators 112 programmed to display a color associated with a temperature proximate to such visual indicator 122. For example, a continuum of red, orange, yellow, green, blue, and purple may each represent a range of temperatures.

At step 710, the lighting control subsystem may determine if the user has made a request to end thermal diagnosis. Examples of such user request are a user interaction (e.g., button press) indicating such request and a user's interaction with a management console interfacing with management module 112. If the user has made an indication to end thermal diagnosis, method 700 may proceed to step 712. Otherwise, method 700 may remain at step 710 until the user has made an indication to end thermal diagnosis.

At step 712, responsive to the user making an indication to end thermal diagnosis, the lighting control subsystem may cause visual indicators 122 to cease illumination. After completion of step 712, method 700 may end.

Although FIG. 7 discloses a particular number of steps to be taken with respect to method 700, method 700 may be executed with greater or fewer steps than those depicted in FIG. 7. In addition, although FIG. 7 discloses a certain order of steps to be taken with respect to method 700, the steps comprising method 700 may be completed in any suitable order.

Method 700 may be implemented using a management module 112, system-level control module 212, and/or any other system operable to implement method 700. In certain embodiments, method 700 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A programmable dynamic information handling system rack lighting system, comprising:
    an array of a plurality of system-level visual indicators configured to be programmed such that each information handling system of a chassis is associated with a set of one or more of the plurality of system-level visual indicators;
    a lighting control subsystem configured to control illumination of the plurality of system-level visual indicators based on statuses of information handling systems of the chassis, such that the lighting control subsystem causes each set of the system-level visual indicators to illuminate based on a status of the respective information handling system associated with such set;
    a chassis-level visual indicator other than the plurality of system-level visual indicators;
    wherein the lighting control subsystem is further configured to control illumination of the chassis-level visual indicator to indicate chassis-level status based on the respective statuses of the information handling systems of the chassis; and
    wherein the chassis-level visual indicator and the system-level visual indicator are positioned such that the chassis-level visual indicator is visible to a person from at least one perspective of the person in which the system-level visual indicator is not visible to the person.

2. The programmable dynamic information handling system rack lighting system of claim 1, wherein the status of each respective information handling system is indicative of whether an unresolved event has occurred within such information handling system.

3. The programmable dynamic information handling system rack lighting system of claim 1, wherein the status of each respective information handling system is indicative of a temperature proximate to such information handling system.

4. The programmable dynamic information handling system rack lighting system of claim 1, wherein the lighting control subsystem is configured to cause illumination of a set of the system-level visual indicators associated with an information handling system responsive to an event occurring within such information handling system and responsive to a user being proximate to the chassis.

5. The programmable dynamic information handling system rack lighting system of claim 1, the lighting control subsystem configured to illuminate all sets of the system-level visual indicators in response to an indication that a user is servicing the chassis.

6. The programmable dynamic information handling system rack lighting system of claim 1, wherein controlling illumination of the plurality of system-level visual indicators comprises one of:
    causing illumination of a set of system-level visual indicators associated with a respective information handling system in response to an event occurring within such information handling system while leaving other sets of system-level visual indicators associated with unaffected information handling systems non-illuminated; and causing illumination of the set of system-level visual indicators associated with the respective information handling system to a particular color in response to the event occurring within such information handling system while causing illumination of sets of system-level visual indicators associated with unaffected information handling systems to a color other than the particular color.

7. A method comprising:

programming an array of a plurality of system-level visual indicators such that each information handling system of a chassis is associated with a set of one or more of the plurality of system-level visual indicators;

controlling illumination of the plurality of system-level visual indicators based on statuses of information handling systems of the chassis, such that a lighting control subsystem causes each set of the system-level visual indicators to illuminate based on a status of the respective information handling system associated with such set;

controlling illumination of a chassis-level visual indicator other than the plurality of system-level visual indicators to indicate chassis-level status based on the respective statuses of the information handling systems of the chassis; and wherein the chassis-level visual indicator and the system-level visual indicator are positioned such that the chassis-level visual indicator is visible to a person from at least one perspective of the person in which the system-level visual indicator is not visible to the person.

8. The method of claim 7, wherein the status of each respective information handling system is indicative of whether an unresolved event has occurred within such information handling system.

9. The method of claim 7, wherein the status of each respective information handling system is indicative of a temperature proximate to such information handling system.

10. The method of claim 7, further comprising causing illumination of a set of the system-level visual indicators associated with an information handling system responsive to an event occurring within such information handling system and responsive to a user being proximate to the chassis.

11. The method of claim 7, further comprising illuminating all sets of the system-level visual indicators in response to an indication that a user is servicing the chassis.

12. The method of claim 7, wherein controlling illumination of the plurality of system-level visual indicators comprises one of:

causing illumination of a set of system-level visual indicators associated with a respective information handling system in response to an event occurring within such information handling system while leaving other sets of system-level visual indicators associated with unaffected information handling systems non-illuminated; and causing illumination of the set of system-level visual indicators associated with the respective information handling system to a particular color in response to the event occurring within such information handling system while causing illumination of sets of system-level visual indicators associated with unaffected information handling systems to a color other than the particular color.

13. An article of manufacture comprising:

a non-transitory computer-readable medium; and computer-executable instructions carried on the computer-readable medium, the instructions readable by a processor, the instructions, when read and executed, for causing the processor to:

program an array of a plurality of system-level visual indicators such that each information handling system of a chassis is associated with a set of one or more of the plurality of system-level visual indicators;

control illumination of the plurality of system-level visual indicators based on statuses of information handling systems of the chassis, such that a lighting control subsystem causes each set of the system-level visual indicators to illuminate based on a status of the respective information handling system associated with such set;

control illumination of a chassis-level visual indicator other than the plurality of system-level visual indicators to indicate chassis-level status based on the respective statuses of the information handling systems of the chassis; and wherein the chassis-level visual indicator and the system-level visual indicator are positioned such that the chassis-level visual indicator is visible to a person from at least one perspective of the person in which the system-level visual indicator is not visible to the person.

14. The article of claim 13, wherein the status of each respective information handling system is indicative of whether an unresolved event has occurred within such information handling system.

15. The article of claim 13, wherein the status of each respective information handling system is indicative of a temperature proximate to such information handling system.

16. The article of claim 13, the instructions for further causing the processor to cause illumination of a set of the system-level visual indicators associated with an information handling system responsive to an event occurring within such information handling system and responsive to a user being proximate to the chassis.

17. The article of claim 13, the instructions for further causing the processor to cause illumination of all sets of the system-level visual indicators in response to an indication that a user is servicing the chassis.

18. The article of claim 13, wherein controlling illumination of the plurality of system-level visual indicators comprises one of:

causing illumination of a set of system-level visual indicators associated with a respective information handling system in response to an event occurring within such information handling system while leaving other sets of system-level visual indicators associated with unaffected information handling systems non-illuminated; and causing illumination of the set of system-level visual indicators associated with the respective information handling system to a particular color in response to the event occurring within such information handling system while causing illumination of sets of system-level visual indicators associated with unaffected information handling systems to a color other than the particular color.

\* \* \* \* \*